United States Patent
D'Sidocky et al.

(10) Patent No.: US 7,534,828 B2
(45) Date of Patent: *May 19, 2009

(54) PNEUMATIC TIRE HAVING A RUBBER COMPONENT CONTAINING N, N'-(M-PHENYLENE) BISMALEAMIC ACID

(75) Inventors: Richard Michael D'Sidocky, Ravenna, OH (US); Larry Ashley Gordon, Akron, OH (US); Bruce Raymond Hahn, Hudson, OH (US); Denise Jeannette Keith, Akron, OH (US); John Eugene Varner, Barberton, OH (US); Rebecca Lee Dando, Uniontown, OH (US); Jeremy Elton Miracle, Wadsworth, OH (US); Douglas Blair Dotts, Mogadore, OH (US); Carl Trevor Ross Pulford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 19 days.

This patent is subject to a terminal disclaimer.

(21) Appl. No.: 11/311,494

(22) Filed: Dec. 19, 2005

(65) Prior Publication Data
US 2007/0142508 A1 Jun. 21, 2007

(51) Int. Cl.
C08K 3/34 (2006.01)
C08K 3/04 (2006.01)
B60C 11/00 (2006.01)
B60C 27/00 (2006.01)
B60C 5/00 (2006.01)
B60C 13/02 (2006.01)

(52) U.S. Cl. .................. 524/493; 524/495; 152/209.1; 152/450; 152/525

(58) Field of Classification Search .............. 524/493, 524/495; 152/209.1, 450, 525
See application file for complete search history.

(56) References Cited

U.S. PATENT DOCUMENTS

| | | | |
|---|---|---|---|
| 3,904,592 A | 9/1975 | Sexsmith et al. ........... 260/83.3 |
| 4,376,189 A | 3/1983 | Trivette ...................... 525/291 |
| 4,433,114 A | 2/1984 | Coran et al. ............. 525/332.6 |
| 5,153,248 A | 10/1992 | Muse et al. ................. 524/105 |
| 5,194,513 A | 3/1993 | Wideman et al. ........ 525/329.3 |
| 5,262,488 A | 11/1993 | Maly et al. ................. 525/282 |
| 5,300,585 A | 4/1994 | Wideman et al. ........ 525/332.7 |
| 5,328,636 A | 7/1994 | Maly et al. ............. 252/182.17 |
| 5,328,963 A | 7/1994 | Muse et al. ................. 525/282 |
| 5,503,940 A | 4/1996 | Majumdar et al. .......... 428/492 |
| 5,616,279 A | 4/1997 | D'Sidocky et al. ..... 252/182.17 |
| 5,696,188 A | 12/1997 | D'Sidocky et al. .......... 524/219 |
| 5,698,620 A | 12/1997 | Wideman et al. ........... 524/270 |
| 5,736,615 A | 4/1998 | D'Sidocky et al. ........ 525/329.3 |
| 5,872,167 A | 2/1999 | Wideman et al. ........... 524/323 |
| 5,981,637 A | 11/1999 | Blok et al. .................. 524/219 |
| 5,985,963 A | 11/1999 | D'Sidocky et al. .......... 524/105 |
| 6,079,468 A | 6/2000 | D'Sidocky et al. .......... 152/564 |
| 6,297,325 B1 | 10/2001 | Wideman et al. ........... 525/282 |
| 6,326,438 B1 | 12/2001 | D'Sidocky et al. ....... 525/331.1 |
| 6,506,849 B1 | 1/2003 | Hojo et al. ............... 525/332.7 |
| 6,533,008 B1 * | 3/2003 | Lickes et al. .............. 152/209.5 |
| 6,747,099 B1 | 6/2004 | Novits et al. ............. 525/330.9 |
| 6,982,050 B2 | 1/2006 | Chauvin et al. .......... 264/36.14 |
| 2002/0177641 A1 | 11/2002 | Ezawa et al. ................. 524/191 |
| 2003/0199619 A1 * | 10/2003 | Cruse .......................... 524/261 |

FOREIGN PATENT DOCUMENTS

| | | |
|---|---|---|
| EP | 1226982 | 7/2002 |
| EP | 1241212 | 9/2002 |
| EP | 1445277 | 8/2004 |
| FR | 2859730 | 9/2003 |
| GB | 880596 | 3/1960 |

OTHER PUBLICATIONS

Patent Abstracts of Japan, Publication No. 05-086235; Date of Pub. of App. Apr. 6, 1993.
Patent Abstracts of Japan, Publication No. 07-157599; Date of Pub. of App. Jun. 20, 1995.
Patent Abstracts of Japan, Publication No. 08-059898; Date of Pub. of App. Mar. 5, 1996.
Patent Abstracts of Japan, Publication No. 08-109275; Date of Pub. of App. Apr. 30, 1996.
Patent Abstracts of Japan, Publication No. 2000-159934; Date of Pub. of App. Jun. 13, 2000.
Patent Abstracts of Japan, Publication No. 2001-064443; Date of Pub. of App. Mar. 13, 2001.
Patent Abstracts of Japan, Publication No. 2002-206035; Date of Pub. of App. Jul. 26, 2002.
Date of Completion of European Search Report Apr. 20, 2007.

* cited by examiner

*Primary Examiner*—Mark Eashoo
*Assistant Examiner*—Angela C Scott
(74) *Attorney, Agent, or Firm*—John D. DeLong

(57) ABSTRACT

The present invention relates to a pneumatic tire having a rubber component comprised of
(A) 100 parts by weight of at least one elastomer containing olefinic unsaturation;
(B) 10 to 120 phr of a filler selected from carbon black and silica;
(C) 0.1 to 10 phr of N,N'-(m-phenylene)bismaleamic acid;
(D) 0.1 to 0.5 phr of zinc dibenzyl dithiocarbamate; and
(E) 0.1 to 5 phr of an additional cure accelerator.

13 Claims, No Drawings

PNEUMATIC TIRE HAVING A RUBBER COMPONENT CONTAINING N,N'-(M-PHENYLENE) BISMALEAMIC ACID

FIELD OF THE INVENTION

The present invention relates to the use of N,N'-(m-phenylene)bismaleamic acid in rubber compositions for use in a pneumatic tire.

BACKGROUND OF THE INVENTION

In the manufacture of rubber articles, crude or raw rubber is compounded with various ingredients among which are sulfur and accelerators of vulcanization. The primary function of an accelerator or accelerator system is to increase the rate of the vulcanization process while allowing sufficient time to mix the accelerators into the rubber at an elevated temperature before vulcanization commences. This delay before the initiation of vulcanization is commonly referred to as scorch time.

The properties of a final rubber vulcanizate that are of importance include tensile strength, set, hysteresis, aging properties, reversion resistance and others. Other factors relating to the vulcanization which are of importance are the rate of cure, the cure time, the scorch behavior, the extent of cure, and tear resistance. These physical properties can be altered either beneficially or detrimentally through the inclusion of chemicals or components that impact upon the rate and state of vulcanization. Increasing performance requirements for tire continues to require improvements in the performance of tire rubber compounds.

SUMMARY OF THE INVENTION

The present invention relates to a pneumatic tire having a rubber component containing N,N'-(m-phenylene)bismaleamic acid and zinc dibenzyldithiocarbamate.

DETAILED DESCRIPTION OF THE INVENTION

There is disclosed a pneumatic tire having a rubber component comprised of (A) 100 parts by weight of at least one elastomer containing olefinic unsaturation;

(B) 10 to 120 phr of a filler selected from carbon black and silica;

(C) 0.1 to 10 phr of N,N'-(m-phenylene)bismaleamic acid;

(D) 0.1 to 0.5 phr of zinc dibenzyl dithiocarbamate; and (E) 0.1 to 5 phr of an additional cure accelerator.

The present invention relates to a pneumatic tire having a rubber component containing elastomers having olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are natural rubber, polybutadiene and SBR.

In one aspect, the rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 10 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The pneumatic tire of the present invention is of conventional design having (A) a carcass reinforced with biased or radially-extending cords, two axially-spaced bead portions, two axially-spaced sidewall portions, one adjacent to each bead portion and a crown portion intermediate the sidewall portions, (B) a circumferentially extending belt structure radially outwardly of the carcass at the crown portion and (C) a tread section radially outwardly of the belt structure.

The rubber component of the tire of the present invention which contains the N,N'-(m-phenylene)bismaleamic acid may be located in the carcass, part of the belt structure and/or tread. For example, as part of the carcass, the component may be the apex, wirecoat, ply coat, squeegee compounds, gum strips, chafer, reinforcing sidewall inserts or exposed sidewall. As part of the tread section, the component may be the tread base or tread cap. The compound may also be the innerliner.

The rubber composition for use in the rubber component of the tire of the present invention contains N,N'-(m-phenylene) bismaleamic acid. The N,N'-(m-phenylene)bismaleamic acid used in the present invention may be present at various levels in the rubber compounds of the present invention. For example, the level of N,N'-(m-phenylene)bismaleamic acid may range from about 0.1 to 10.0 by weight per 100 parts of rubber (also known as "phr"). Preferably, the level of N,N'-(m-phenylene)bismaleamic acid ranges from about 0.5 to about 5.0 phr.

The rubber composition contains a filler selected from carbon black and silica to contribute the desired properties of the rubber component. The filler may be used in conventional amounts ranging from 10 to 120 phr. For example, when used, the silica filler may be added in amounts ranging from 10 to 120 phr. Preferably, the silica is present in an amount ranging from 20 to 80 phr.

The commonly employed siliceous pigments used in rubber compounding applications can be used as the silica in this invention, including pyrogenic and precipitated siliceous pigments (silica) and aluminosilicates, although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1938).

The silica may also be typically characterized by having a dibutylphthalate (DBP) absorption value in a range of about 100 to about 400, and more usually about 150 to about 300.

Further, the silica, as well as the aforesaid alumina and aluminosilicate may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well-known means for characterization of silica.

Mercury surface area/porosity is the specific surface area determined by Mercury porosimetry. For such technique, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, Page 39 (1959) or according to DIN 66133. For such an evaluation, a CARLO-ERBA Porosimeter 2000 might be used.

The average mercury porosity specific surface area for the silica should be in a range of about 100 to 300 m²/g.

A suitable pore-size distribution for the silica, alumina and aluminosilicate according to such mercury porosity evaluation is considered herein to be five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2, VN3, BV3380GR, etc, and silicas available from Huber, for example Huber Sil 8745.

As can be appreciated by one skilled in the art, it may be desirable to add to the silica containing rubber compound a sulfur containing organosilicon compound. Examples of suitable sulfur containing organosilicon compounds are of the formula:

II in which Z is selected from the group consisting of

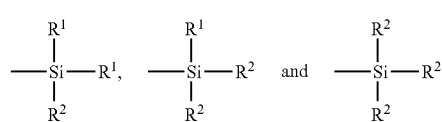

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms, and n is an integer of 2 to 8.

Specific examples of sulfur containing organosilicon compounds of Formula II which may be used in accordance with the present invention include: 3,3'-bis(triethoxysilylpropyl) disulfide, 3,3'-bis(triethoxysilylpropyl)tetrasulfide, 3,3'-bis (triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl) tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis (diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis (butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur containing organosilicon compounds of Formula II are the 3,3'-bis(trimethoxy or triethoxy silylpropyl)sulfides. The most preferred compounds are 3,3'-bis (triethoxysilylpropyl)tetrasulfide and 3,3'-bis(triethoxysilylpropyl)disulfide.

Preferably Z is

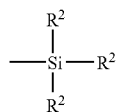

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 4.

The amount of the above sulfur containing organosilicon compound of Formula II in a rubber composition will vary depending on the level of silica that is used. Generally speaking, the amount of the compound of Formula II will range from 0 to 1.0 parts by weight per part by weight of the silica. Preferably, the amount will range from 0 to 0.4 parts by weight per part by weight of the silica.

The commonly employed and commercially available carbon blacks used in rubber compounding applications can be used in the compositions of the present invention. Representative examples of such carbon blacks include those known by the following ASTM designations, N110, N121, N134, N205, N220, N231, N234, N242, N293, N299, S315, N326, N330, N332, N339, N343, N347, N351, N358, N375, N472, N539, N550, N582, N630, N642, N650, N660, N683, N754, N762, N765, N774, N787, N907, N908, N990 and N991. When carbon black is used, the amount may vary. Generally speaking, the amount of carbon black may vary from 10 to 120 phr. Preferably, the amount of carbon black will range from 20 to 80 phr. It is to be appreciated that a silica coupler may be used in conjunction with a carbon black (namely, pre-mixed with a carbon black prior to addition to the rubber composition) and such carbon black is to be included in the aforesaid amount of carbon black for the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, modified starches, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 0.5 to 6 phr being preferred. Typical amounts of tackifier or pre-reacted resins comprise about 0.5 to about 10 phr, usually about 1 to about 5 phr. Typical amounts of processing aids comprise about 1 to about 50 phr. Such processing aids can include, for example, aromatic, napthenic and/or paraffinic processing oils. Typical amounts of antioxidants comprise about 1 to about 5 phr. Representative antioxidants may be, for example, monophenols, bisphenols and thiobisphenols, polyphenols, hydroquinones derivatives, phosphites, thioesters, naphthylamines, diphenylamine derivatives, para-phenylenediamines, quinolines and others, such as, for example, those disclosed in *The Vanderbilt Rubber Handbook* (1978), Pages 344 through 346. Typical amounts of antiozonants comprise about 1 to 5 phr. Representative examples of such antiozonants may be, for example, para-phenylenediamines such as diaryl-p-phenylenediamines, dialkyl-p-phenylenediamine and alkyl-aryl-p-phenylenediamines. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline and paraffinic waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur-vulcanizable rubber composition is then sulfur-cured or vulcanized.

Accelerators are used to control the time and/or temperature required for vulcanization and to improve the properties of the vulcanizate. In one embodiment, a additional cure accelerator may is used in addition to the zinc dibenzyl dithiocarbamate. The additional cure accelerator(s) may be used in total amounts ranging from about 0.5 to about 4, preferably about 0.8 to about 3.0, phr. In another embodiment, combinations of a primary and a secondary accelerator might be used as the additional cure accelerator with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, xanthates. Dithiocarbamates, in addition to the zinc dibenzyl dithiocarbamate, may also be used. Peroxide curatives may also be present. Preferably, the additional cure accelerator is a sulfenamide or thiazole. If a second additional accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines. Specific methylene donors include hexakis-(methoxymethyl)melamine, N,N',N''-trimethyl/N,N',N''-trimethylolmelamine, hexamethylolmelamine, N,N',N''-dimethylolmelamine, N-methylolmelamine, N,N'-dimethylolmelamine, N,N',N''-tris(methoxymethyl)melamine and N,N'N'''-tributyl-N,N',N''-trimethylol-melamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

When the compound of the present invention is used as a wire coat or bead coat for use in a tire, an organo-cobalt compound may be present which serves as a wire adhesion promoter. When used, any of the organo-cobalt compounds known in the art to promote the adhesion of rubber to metal may be used. Thus, suitable organo-cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Manobond C from Wyrough and Loser, Inc, Trenton, N.J.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished stock composition. Accordingly, it may in general be stated that the amount of organo-cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica, compound of Formula II and carbon black, if used, are mixed in one or more non-productive mix stages. The terms "non-productive" and "productive" mix stages are well known to those having skill in the rubber mixing art. The N,N'-(m-phenylene)bismaleamic acid may be added at any stage of mixing but is preferably added in a nonproductive stage. The rubber composition containing the rubber and generally at least part of the silica should, as well as the sulfur-containing organosilicon compound of Formula II, if used, be subjected to a thermomechanical mixing step. The thermomechanical-mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The above tread rubber composition is used to prepare an assembly of a tire with a tread comprised of the said rubber composition. Such tire is then vulcanized.

Accordingly, the invention contemplates a vulcanized tire prepared with the N,N'-(m-phenylene)bismaleamic acid described herein.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The pneumatic tire of the present invention may be a passenger tire, aircraft tire, agricultural, earthmover, off-the-road, truck tire and the like. Preferably, the tire is a passenger or truck tire. The tire may also be a radial or bias, with a radial tire being preferred.

The invention is further illustrated by the following example.

EXAMPLE 1

In this example, the effect of adding N,N'-(m-phenylene) bismaleamic acid and zinc dibenzyl dithiodicarbamate in a rubber compound with silica and carbon black is illustrated. Table 1 below shows the basic rubber compound that was used in this example. Table 2 shows the amounts of zinc dibenzyl dithiodicarbamate or zinc dimethyl dithiodicarbamate used in each of Samples 1 through 4. Inventive Sample 4 contained 0.3 phr of zinc dibenzyl dithiocarbamate, which is approximately equal on a molar basis to the 0.15 phr of zinc dimethyl dithiocarbamate used in control Sample 2. The rubber compounds were prepared in a three-stage Banbury mix. All parts and percentages are by weight unless otherwise noted. The cure data as well as other physical data for each sample are listed in Tables 3 and 4.

Cure properties were determined using a Monsanto moving disc rheometer (MDR) which was operated at a temperature of 150° C., 160° C. and 182° C. with a frequency of 1.67 hertz and a 0.5 degree arc. A description of moving disc rheometers and the use of this cure meter and standardized values read from the curve are specified in ASTM D-5289. A typical cure curve obtained with a moving disc rheometer is shown on Page 794 of ASTM D-5289.

Viscoelastic properties Tan Delta and G' were measured at 10 percent strain using an Alpha Technologies Rubber Process Analyzer (RPA). A description of the RPA 2000, its capability, sample preparation, tests and subtests can be found in these references. H A Pawlowski and J S Dick, *Rubber World*, June 1992; J S Dick and H A Pawlowski, *Rubber World*, January 1997; and J S Dick and J A Pawlowski, *Rubber & Plastics News*, Apr. 26 and May 10, 1993.

TABLE 1

Rubber Compound Formulation

*First Non-Productive Mix Stage*

| | |
|---|---|
| Polybutadiene[1] | 10 |
| Natural Rubber | 90 |
| Silica | 12 |
| Carbon Black | 23 |
| N,N'-(m-phenylene) bismaleamic acid | 3 |
| Wax[2] | 1.5 |
| Stearic Acid | 2 |
| Antidegradant[3] | 1 |
| Zinc Oxide | 3 |

*Second Non-Productive Mix Stage*

| | |
|---|---|
| Silica | 11 |

*Productive Mix Stage*

| | |
|---|---|
| Antidegradant[4] | 1 |
| Zinc Dimethyl Dithiocarbamate | variable as per Table 2 |
| Zinc Dibenzyl Dithiocarbamate | variable as per Table 2 |
| Accelerator[5] | 1 |
| Sulfur[6] | 2.4 |

[1]Budene 1207 from The Goodyear Tire & Rubber Company
[2]microcrystalline and paraffinic types
[3]paraphenylene diamine type
[4]paraphenylene diamine type
[5]sulfenamide type
[6]total of oiled (20 percent) and non-oiled sulfur, expressed as sulfur

TABLE 2

Zinc Dithiocarbamate Addition

| | Sample No. | | | |
|---|---|---|---|---|
| | Control 1 | Control 2 | Control 3 | Invention 4 |
| Zinc Dimethyl Dithiocarbamate | 0 | 0.15 | 0.3 | 0 |
| Zinc Dibenzyl Dithiocarbamate | 0 | 0 | 0 | 0.3 |

TABLE 3

MDR

| | Sample No. | | | |
|---|---|---|---|---|
| | Control 1 | Control 2 | Control 3 | Invention 4 |
| 150° C. | | | | |
| S' Max − S' Min dNm | 9.86 | 12.19 | 13.43 | 13.15 |
| TC 90 Minutes | 15.73 | 8.13 | 5.56 | 6.75 |
| S' Max dNm | 12.54 | 14.89 | 16.14 | 15.7 |
| S' at 60 Min dNm | 11.66 | 13.63 | 15.43 | 15.24 |
| Percent loss S' Max at 60 Min | 7 | 8.5 | 4.4 | 2.9 |
| 160° C. | | | | |
| S' Max − S' Min dNm | 10.31 | 12.23 | 13.44 | 13.06 |
| TC 90 Minutes | 8.16 | 4.53 | 3.18 | 3.76 |
| S' Max dNm | 12.94 | 14.92 | 16.04 | 15.7 |
| S' at 60 Min dNm | 10.92 | 12.72 | 14.36 | 14.82 |
| Percent loss S' Max at 60 Min | 15.6 | 14.7 | 10.5 | 5.6 |
| 182° C. | | | | |
| S' Max − S' Min dNm | 10.68 | 12.13 | 12.85 | 12.89 |
| TC 90 Minutes | 1.87 | 1.34 | 1.05 | 1.16 |
| S' Max dNm | 13.16 | 14.73 | 15.52 | 15.42 |
| S' at 60 Min dNm | 9.85 | 10.93 | 11.84 | 13 |
| Percent loss S' Max at 60 Min | 25.2 | 25.8 | 23.7 | 15.7 |

TABLE 4

RPA 2000

| | Sample No. | | | |
|---|---|---|---|---|
| | Control 1 | Control 2 | Control 3 | Invention 4 |
| *Samples Cure 150° C., 30 min, 1.67 Hz and 3.5% Strain Strain Sweep at 100° C. and 1 Hz* | | | | |
| G' at 1% (MPa) | 1.5035 | 1.631 | 1.7745 | 1.7957 |
| G' at 10% (MPa) | 1.1262 | 1.2287 | 1.3476 | 1.353 |
| Tan delta at 1% | 0.049 | 0.046 | 0.042 | 0.041 |
| Tan delta at 10% | 0.077 | 0.067 | 0.062 | 0.064 |
| *Samples Cure 160° C., 16.4 min, 1.67 Hz and 3.5% Strain Strain Sweep at 100° C. and 1 Hz* | | | | |
| G' at 1% (MPa) | 1.5195 | 1.6789 | 1.8489 | 1.7745 |
| G' at 10% (MPa) | 1.1124 | 1.2239 | 1.353 | 1.2938 |
| Tan delta at 1% | 0.056 | 0.047 | 0.04 | 0.036 |
| Tan delta at 10% | 0.084 | 0.076 | 0.071 | 0.07 |
| *Samples Cure 182° C. 30 min, 1.67 Hz and 3.5% Strain Strain Sweep at 100° C., and 1 Hz* | | | | |
| G' at 1% (MPa) | 1.6682 | 1.7532 | 1.8489 | 1.8436 |
| G' at 10% (MPa) | 1.1689 | 1.2351 | 1.3311 | 1.3215 |
| Tan delta at 1% | 0.067 | 0.061 | 0.049 | 0.043 |
| Tan delta at 10% | 0.096 | 0.089 | 0.077 | 0.075 |

As seen in the data of Tables 3 and 4, the combination of N,N'-(m-phenylene)bis maleamic acid combined with zinc dibenzyl dithiocarbamate shows advantages in rubber compounds as compared with the control compound containing N,N'-(m-phenylene)bismaleamic acid alone or combined with zinc dimethyl dithiocarbamate. Advantages include substantially improved reversion resistance, increase in cured stiffness, and lower hysteresis as compared with controls containing zinc dimethyl dithiocarbamate or no substituted zinc dithiocarbamate.

With reference to Table 3, Sample 4 with zinc dibenzyl dithiocarbamate showed unexpectedly lower reversion as compared with the control samples 1 through 3. Reversion was measured as the percent difference in torque S' at 60 minutes cure time compared with the maximum torque S' Max, and expressed as percent loss S' Max at 60 min. For each of the cure temperatures considered, the reversion for Sample 4 was substantially less than for the controls. Surprisingly, the reversion for Sample 4 was lower even than that for the control sample 3, which had about double the amount of zinc dimethyl dithiocarbamate on a molar basis as compared to the zinc dibenzyl dithiocarbamate in Sample 4. Reversion resistance is desirable to prevent loss of properties during high temperature use of the tire.

With reference to Table 4, Sample 4 showed improved stiffness (G') and tan delta as compared with the control samples 1 and 2, and substantially similar stiffness and tan delta to control sample 3. It is desirable to have the ability to increase stiffness with reducing tan delta in tread compounds for improved handling and better fuel economy/durability.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component comprised of
   (A) 100 parts by weight of at least one elastomer containing olefinic unsaturation;
   (B) 10 to 120 phr of a filler selected from carbon black and silica;
   (C) 0.5 to 5 phr of N,N'-(m-phenylene)bismaleamic acid;
   (D) 0.1 to 0.5 phr of zinc dibenzyl dithiocarbamate; and
   (E) 0.1 to 1 phr of a sulfenamide.

2. The pneumatic tire of claim 1 wherein said elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

3. The pneumatic tire of claim 1 wherein said silica is precipitated silica.

4. The pneumatic tire of claim 1 wherein a sulfur containing organosilicon compound is present in said tread and is of the formula:

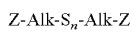

in which Z is selected from the group consisting of

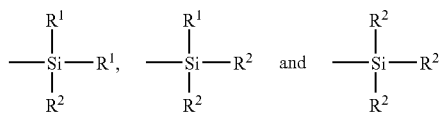

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms, and n is an integer of 2 to 8.

5. The pneumatic tire of claim 1 wherein said silica is present in an amount ranging from 20 to 80 phr.

6. The pneumatic tire of claim 1 wherein said carbon black is present in an amount ranging from 20 to 80 phr.

7. The pneumatic tire of claim 1 wherein said tire has
   (A) a carcass reinforced with radially-extending cords,
   (B) a circumferentially-extending sidewall portion, and
   (C) a tread section.

8. The pneumatic tire of claim 1 wherein said rubber component is part of the carcass.

9. The pneumatic tire of claim 1 wherein said rubber component is selected from the group consisting of the apex, wirecoat, ply coat, squeegee compounds, gum strips, chafer, reinforcing sidewall inserts and exposed sidewall.

10. The pneumatic tire of claim 1 wherein said rubber component is part of the tread section.

11. The pneumatic tire of claim 1 wherein said rubber component is the tread cap.

12. The pneumatic tire of claim 1 wherein said rubber component is the tread base.

13. The pneumatic tire of claim 1 wherein said rubber component is an innerliner.

* * * * *